Sept. 2, 1969 E. D. SIMSHAUSER 3,465,199

ELECTRONIC HALFTONE IMAGE GENERATOR

Filed Nov. 26, 1968

INVENTOR
ELVIN D. SIMSHAUSER

BY John T. O'Halloran
ATTORNEY

United States Patent Office 3,465,199

Patented Sept. 2, 1969

3,465,199

ELECTRONIC HALFTONE IMAGE GENERATOR

Elvin D. Simshauser, Columbus, N.J., assignor to Radio Corporation of America, a corporation of Delaware Filed Nov. 26, 1968, Ser. No. 779,078

Int. Cl. H01j 29/70

U.S. Cl. 315—22 9 Claims

ABSTRACT OF THE DISCLOSURE

An electronic halftone image generator produces halftone images on the face of an imaging device by scanning the face with a plurality of substantially linear scanlines and periodically unblanking the device during the scanlines to produce a plurality of "dots." The sizes of the dots are made to correspond to the tones to be simulated by unblanking the imaging device for periods of time corresponding to the densities of these tones and by superimposing on the scanlines transverse alternations that have amplitudes corresponding to the densities of these tones.

BACKGROUND OF THE INVENTION

The printing process commonly used in the graphic arts industry, i.e., newspaper publishing, printing, etc. deposit a uniform density of ink on paper whenever it is desired to print all or a portion of an image and deposit no ink when the absence of an image is desired. This all-or-nothing process poses no problem when alphabetical or other characters are printed. However, when pictures, such as photographs, are printed, the problem of reproducing the continuous tones, i.e., light gradations, arises. This problem has been solved by transforming the continuous tones of the original image into continuous images. Halftone images are produced by a large number of inked dots of various sizes. When the largest dots and the spaces on the paper between the dots are made small compared with the visual acuity of the human eye (i.e., they are subliminal), the dots and the paper fuse visually and trick the eye into believing it is seeing various continuous tones.

Recently there have been developed electronic photocomposing machines. The successful transformation of type composition into an electronic art promises to greatly increase the speed of type composition. One such electronic photocomposition system produces character images on the face of a cathode ray tube by building up each character from a plurality of substantially linear and vertical scanlines that form slices of a character. The character images are photographed and the photograph is then processed into a printing plate, such as an offset printing plate.

Such electronic photocomposition systems do not at present produce halftone images. It is desirable to provide a halftone image generator that is compatible with such electronic photocomposition systems so as to make such systems capable of producing both text and pictures.

SUMMARY OF THE INVENTION

A halftone image generator embodying the invention includes a device that is scanned by a plurality of substantially linear scanlines. The device is energized periodically during said scanlines for time periods corresponding to the densities of tones to be simulated and transverse alternations having amplitudes corresponding to said densities are superimposed on the scanlines to produces halftone images simulating said tones.

DETAILED DESCRIPTION

Figures 1, 2, 3:
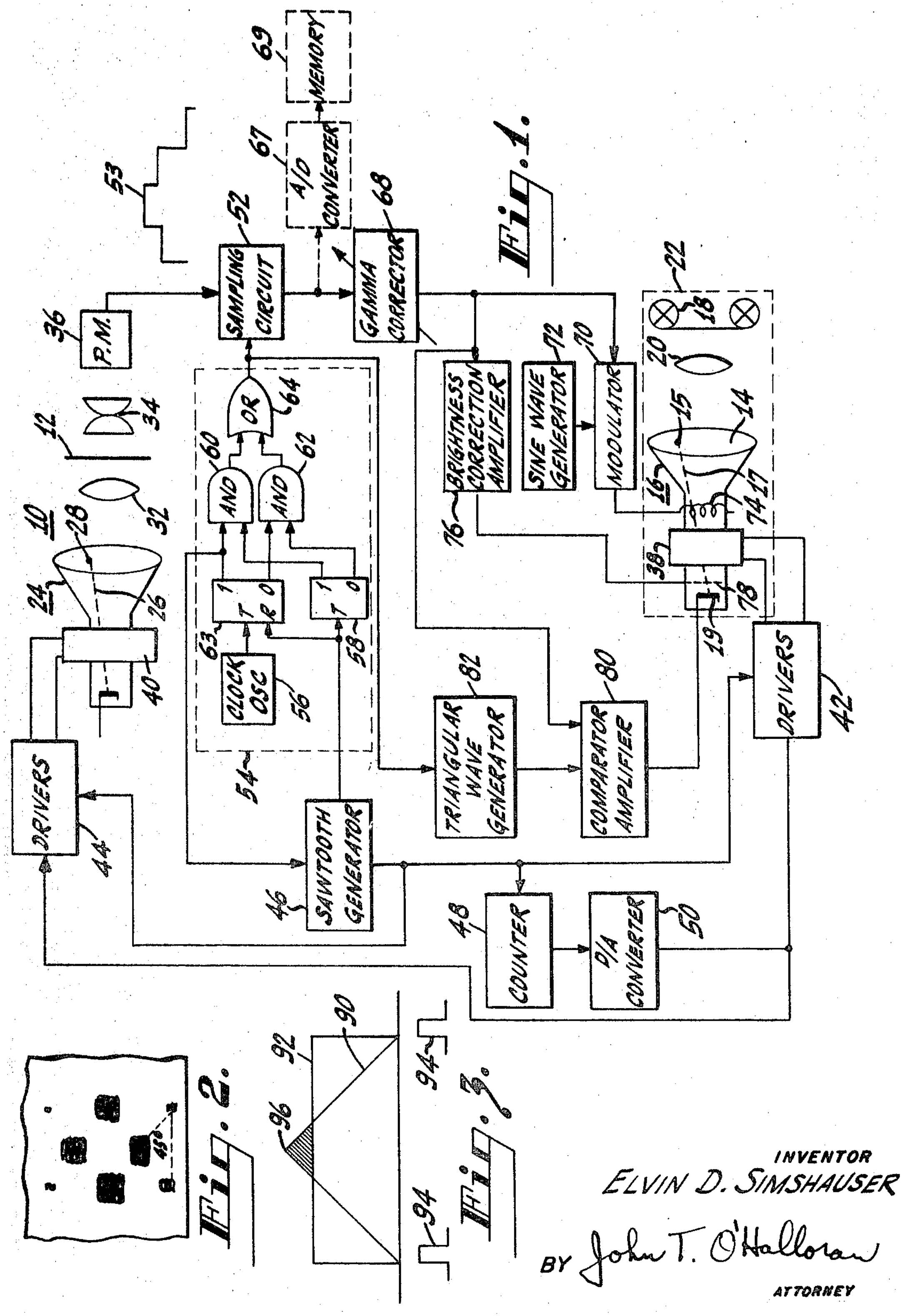
FIGURE 1 is a halftone image generation system embodying the invention.
FIGURE 2 is a pictorial representation of the halftones produced by the system of FIGURE 1.
FIGURE 3 is a graphical representation of certain waveforms produced in the system of FIGURE 1 that are helpful in understanding the invention.

Referring now to FIGURE 1, an electronic halftone image generator 10 converts a continuous tone image on a transparency 12, into a halftone image on the face 14 of a scanning or imaging device, such as a cathode ray tube 16 (shown in the lower part of FIGURE 1.) The halftone image is formed on the face 14 of the device 16 by means of a reproducing light spot 15 created by an electron beam 17 that emanates from a cathode 19 and impinges on the phosphor on the face 14. The halftone image is focused onto a photographic film 18 by a lens system, shown in FIGURE 1 a a single convex lens 20. The device 16, film 18, and the lens 20 are enclosed in a light-tight casette 22, shown dotted in FIGURE 1. The casette 22 has access doors (not shown) for insertion and removal of the film 18, etc.

The halftone image is obtained from the transparency 12 by scanning this transparency with a scanner 24. The scanner 24 may, for example, comprise a flying-spot scanner having an electron beam 26 that produces a light spot 28 on the face of the scanner 24. The scanning light spot 28 is focused by a focusing lens 32 onto the transparency 12. The light penetrating through the transparency 12 is condensed by a condensing lens 34 and projected onto a light sensor such as a photomultiplier (P.M.) tube 36. It is apparent that an opaque photograph may also be scanned with the reflected light from the photograph comprising the image signals.

The reproducing spot 15 and the scanning spot 28 are moved in synchronism with each other by means of deflection coils 38 and 40, respectively. The energizing currents for the deflection coils 38 and 40 are derived from driver amplifiers 42 and 44, respectively. A sawtooth generator 46 provides the vertical deflection signal to cause the scanning spots 15 and 28 to produce a bottom-to-top vertical deflection followed by a quick retrace back to the bottom. The start of each new sawtooth is synchronized with the clock oscillator 56. A counter 48 is coupled to the sawtooth generator 46 to provide a count of each sawtooth wave generated by the generator 46. The count in the counter 48 is converted in a digital-to-analog (D/A) converter (DACON) 50 and the output of the DACON 50 provides the horizontal deflection for the spots 15 and 28. Thus, the counter 48 causes the spots 15 and 28 to move in discrete steps horizontally across the devices 16 and 24, respectively. The deflection may, for example, be from left to right and there may be 100 scans to the inch. Bias and blanking circuits (not shown) produce the necessary bias and blanking signals for the display device 16 and scanner 24.

The light penetrating through the transparency 12 depends on the densities of the tones in the image contained on the transparency 12. This light is converted into a varying electronic signal by the photomultiplier 36 and applied to a sampling circuit 52. The sampling circuit 52 periodically samples the electronic image signals. The sampling circuit 52 is activated by sampling pulses and produces step voltage signals 53 that are substantially constant for the period of time between each sampling pulse. The step voltage signals 53 exhibit amplitudes directly corresponding to the density of the tone being scanned on the transparency 12 at the instant the sampling circuit is activated. The sampling pulses are derived from a timing circuit 54 that includes a clock oscillator 56. The clock oscillator 56 produces pulses of twice the frequency of the sampling pulses. The reason for providing timing pulses of twice the frequency of the sampling pulses is that alternate odd or even sampling pulses are selected on successive scanlines to activate the sampling circuit 52 in order to provide the 45° screening effect common in photographic halftones and as shown in FIGURE 2. Consequently, the sampling circuit 52 is activated by odd sampling pulses on one scanline and even pulses on the next scanline. This is accomplished by triggering a triggerable flip-flop 58 by the output from the vertical sawtooth generator 46 on each scanline. The flip-flop 58 alternates between the set and the reset states thereof to produce "1" and "0" output signals alternately. A pair of AND gates 60 and 62 have applied thereto the "1" and "0" output signals respectively as well as sampling pulses from the clock oscillator 56 as transmitted through a second triggerable flip-flop 63. Each pulse from the oscillator 56 triggers the flip-flop 63 and the "1" and "0" output signals therefrom are applied to the AND gates 60 and 62, respectively. Consequently, on each scanline only one of the AND gates is enabled by the flip-flop 58 and this enabled gate is only activated on alternate pulses from the flip-flop 63. The flip-flop 63 is reset by the sawtooth generator at the end of every scanline so that synchronism is maintained. The pulses derived from the gates 60 and 62 are respectively termed odd and even pulses for convenience and are applied to an OR gate 64 which is in turn coupled to the sampling circuit 52.

When the system is operated off-line, the amplitudes of the step voltage signals 53 are converted to equivalent binary numbers in an analog-to-digital converter 67 and stored in a memory 69. These components are shown dotted in FIGURE 1. Subsequently, the binary signals are read out of the memory 69 and converted back into analog step voltage signals 53 for producing the halftone images on the imaging device 16 in a manner identical to the on-line operation. It is, of course, apparent that in off-line operation, the imaging device 16 may function first as a scanner to scan the transparency 12. The step voltage signals derived from such scanning are stored in the memory 69. Then the imaging device 16 functions as a display device to display the halftone images when the memory 69 is read out.

In on-line operation, the step voltage signals are gamma corrected in a variable gamma-corrector circuit 68. The output of the gamma-corrector circuit 68 is applied to a modulator 70 along with an alternating signal derived from a signal generator 72. The alternating signals from the generator 72 may, for example, be sine waves although other waveforms may also be utilized. The modulator 70 modulates the sine waves in accordance with the amplitude of the step voltage signals and applies the periodic alternating currents to a superimposition coil 74 (i.e., "wobble" coil) that is mounted around the neck of the imaging device 16. The coil 74 superimposes the periodic alternations on the substantially linear scanline sweep of the electron beam 17 to "wobble" the beam transversely as the beam sweeps vertically.

The output of the gamma-corrector 68 is also applied to a brightness correction amplifier 76 which in turn is used to bias the grid 78 of the display device 16 to control the intensity of the electron beam 17 in accordance with the tones in the original transparency 12.

The output of gamma-corrector 68 is also applied to a comparator amplifier 80 along with triangular waves derived from a triangular waveform generator 82. The triangular waveform generator 82 is triggerable and is activated to produce a triangular wave 90 (shown in FIGURE 3) by each sampling pulse 94 applied thereto from the OR gate 64. The comparator amplifier 80 detects when the step voltage signals are lower than the triangular waves to produce bilevel output pulses of variable durations that are applied to the cathode 19 of the imaging device 16 to unblank the electron beam 17 periodically. The bilevel output pulses are coextensive in time with the shaded portion of the triangular wave 90 in FIGURE 3 and are of a polarity to unblank the electron beam 17.

OPERATION

To produce a halftone image of the continuous tones on the transparency 12, the transparency 12 is scanned by a scanner 24 to generate light image signals. The light image signal transmitted through the transparency 12 generates a high amplitude electronic signal in the photomultiplier 36 when the tone scanned has a low density (i.e., is light) and a low amplitude signal when the tone scanned has a high density (i.e., dark). Consequently, the electronic signals faithfully reproduce the tones in the transparency 12. The varying electronic image signals are applied to the sampling circuit 52. The sampling circuit 52 is activated on every other timing pulse derived from the clock oscillator 56 and transmitted through the flip-flop 63. It is assumed on this first scanline that the gate 60 is enabled by the flip-flop 58 and consequently only the odd pulses activate the gate 60. A delay circuit (not shown) may be utilized to couple the timing pulses from the clock oscillator 56 to the flip-flop 63 if a race condition exists between the triggering of the flip-flop 63 on the trailing edge of a timing pulse and the activation of the gates 60 and 62 on the leading edge of these pulses. The odd sampling pulses 94 are shown in FIGURE 3, and when such pulses activate the sampling circuit 52, a step voltage signal 92 of substantially constant amplitude which represents the voltage level of signal 53 for one sampling period, is stored by the sampling circuit 52 until the next succeeding sampling pulse arrives. The step voltage signal 92 exhibits an amplitude that corresponds to the density of the tone being scanned in the transparency 12 at the time the sampling pulse 94 activates the sampling circuit 52. The pulses 94 therefore exhibit the same period as the step voltage signals.

The sampling pulses 94 are also utilized to trigger the triangular wave generator 82 to produce a triangular wave 90. The wave 90 exhibits an isosceles triangular shape with a vertex 96 at the midpoint thereof. The step voltage signal 92 is compared to the triangular wave 90 in the comparator amplifier 80 to produce a bilevel output pulse during the time interval shown shaded in FIGURE 3, which is balanced (time wise) about the vertex 96 and which is applied to the cathode 19 to bias on the electron beam 17. Thus, the imaging device is unblanked for a period of time determined by the step voltage signal 92. A halftone dot is therefore produced on the face 14 of the imaging device 16 and the center of the dot corresponds to the vertex of the triangular wave which vertex is always midway in time and therefore midway in position (because of constant vertical sweep speed) between sync positions. Thus the centers of all the halftone dots are accurately aligned.

The step voltage signals are gamma-corrected and then utilized to modulate the sine waves produced by the generator 72 so that transverse motions are superimposed on the vertical scanlines. The amplitudes of the transverse motions correspond to the density of the tones in the original transparency 12. The modulator 70 which may, for example, comprise a diode modulator is biased such that large amplitude step voltage signals compress the sine wave signals and small amplitude step voltage signals do the opposite. The frequency of the alternating signals from the generator 72 are selected so that the light spot 15 overlaps itself on every alternation. Thus, as shown in FIGURE 2, solid black rectangular dots are produced. The dots are small when the step voltage signals are large. Hence, a positive of the transparency 12 is produced.

The gamma-corrected signals are also applied to the brightness correction amplifier 76 so that low amplitude step voltage signals (large sideways motion) bias the electron beam further on to intensify the light spot 15. This is because large amplitude motions occur with small amplitude step voltage signals and such large motions will not expose the photographic film 18 adequately because of relatively high velocity which results in shorter exposure time. Consequently, this situation must be corrected in order to produce high graphic quality halftones.

Thus, in accordance with the invention, a halftone image generator system is provided which produces halftone images that are compatible with existing electronic photocomposition systems.

What is claimed is:

1. An electronic halftone image generator comprising in combination, a device to be scanned, scanning means for scanning said device by a plurality of substantially linear scanlines, first means for selectively energizing said scanning means during said scanlines to produce dot images on said device, and second means for superimposing on said scanlines a plurality of transverse alternations having amplitudes corresponding to tones to be simulated so as to produce variable sized dots corresponding to said tones to provide a halftone image on said device.

2. The combination in accordance with claim 1 wherein said transverse alternations are derived from a sine wave generator.

3. The combination in accordance with claim 2 wherein said sine wave alternations exhibit a period such that successive alternations overlap each other.

4. The combination in accordance with claim 1 wherein said scanning means is energized by said first means selectively during said scanlines for durations dependent on tones to be simulated.

5. The combination in accordance with claim 4 wherein said first means for selectively energizing said scanning means includes, a triangular wave generator that produces triangular waves that are substantially isosceles in shape and which exhibit a predetermined period.

6. The combination in accordance with claim 5 that further includes, means for providing voltage signals having varying step levels exhibiting amplitudes corresponding to the density of tones to be simulated and exhibiting a period that is substantially identical to the period of said triangular waves.

7. The combination in accordance with claim 6 that further includes, means for comparing said step voltage signals and said triangular wave to produce bilevel output pulses having durations that correspond to said tones to be simulated.

8. The combination in accordance with claim 7 that further includes, means for utilizing said bilevel output pulses to energize said scanning means.

9. The combination in accordance with claim 8 wherein each of said bilevel output pulses exhibits a midpoint that substantially defines the center of a halftone dot.

References Cited

UNITED STATES PATENTS

| | | | |
|---|---|---|---|
| 3,197,558 | 7/1965 | Ernst. | |
| 3,230,303 | 1/1966 | Macovski et al. | |
| 3,428,852 | 2/1969 | Greenblum ---------- | 215—22 |

RODNEY D. BENNETT, Jr., Primary Examiner

T. H. TUBBESING, Assistant Examiner

U.S. Cl. X.R.

178—6.6, 6.7; 315—23